No. 848,199. PATENTED MAR. 26, 1907.
J. OSTRUM.
SHOCKER ATTACHMENT FOR GRAIN HARVESTERS AND BINDERS.
APPLICATION FILED APR. 5, 1906.
2 SHEETS—SHEET 1.
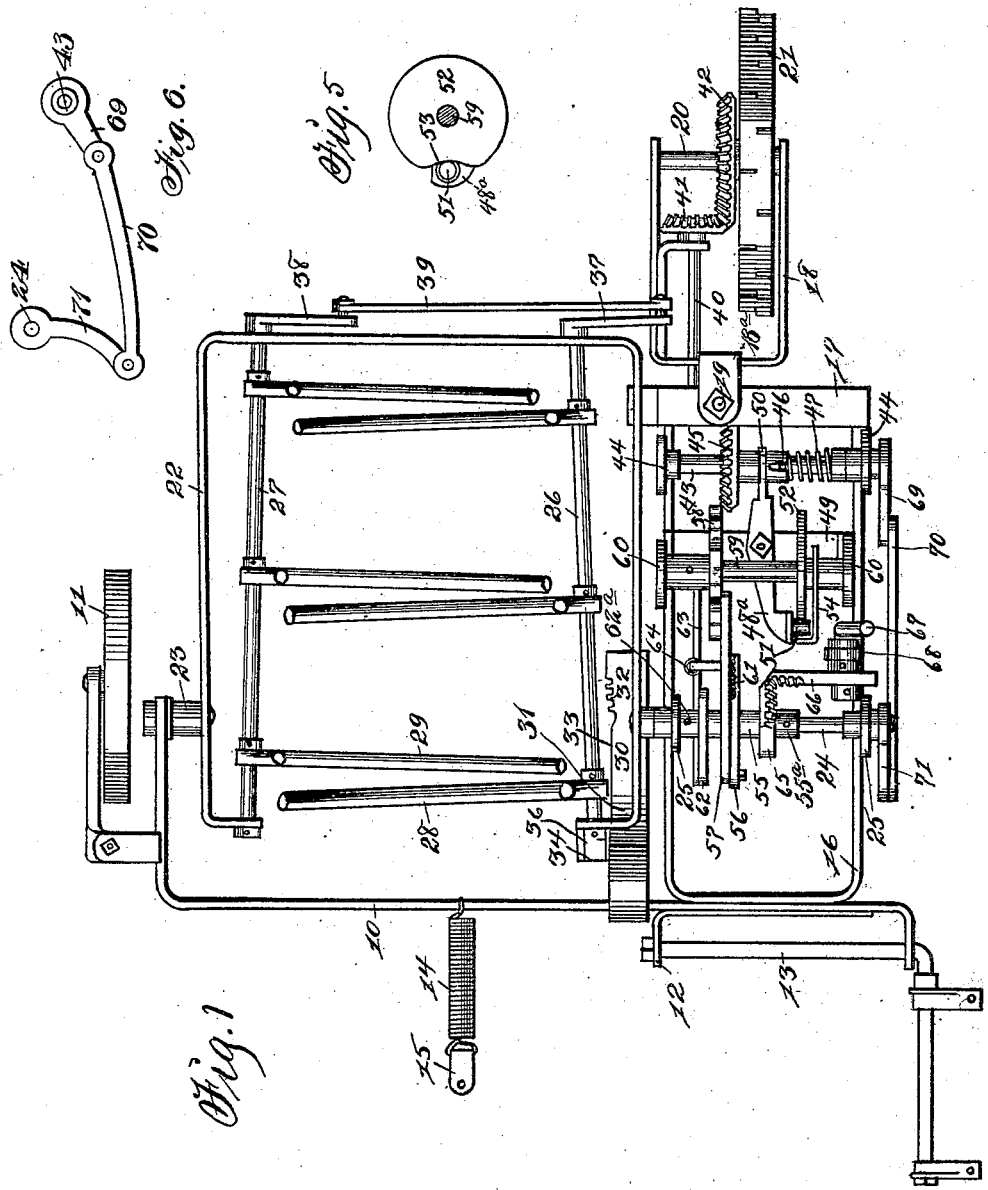
Witnesses: Inventor: John Ostrum,
By Thomas G. Orwig, Attorney.

No. 848,199. PATENTED MAR. 26, 1907.
J. OSTRUM.
SHOCKER ATTACHMENT FOR GRAIN HARVESTERS AND BINDERS.
APPLICATION FILED APR. 5, 1906.
2 SHEETS—SHEET 2.
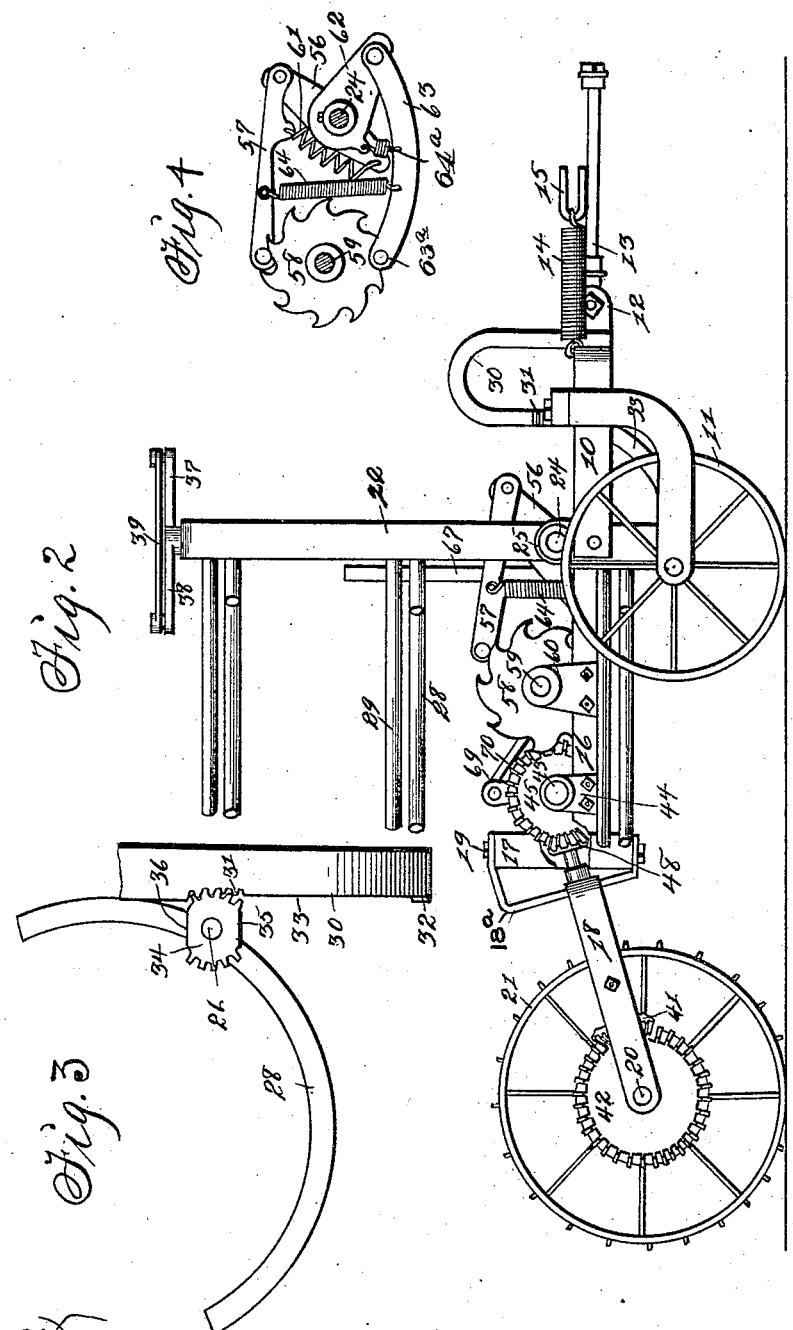
Witnesses:
Inventor: John Ostrum,
By Thomas G. Orwig, Attorney.

UNITED STATES PATENT OFFICE.

JOHN OSTRUM, OF TRAER, IOWA.

SHOCKER ATTACHMENT FOR GRAIN HARVESTERS AND BINDERS.

No. 848,199.            Specification of Letters Patent.        Patented March 26, 1907.

Application filed April 5, 1906. Serial No. 310,157.

*To all whom it may concern:*

Be it known that I, JOHN OSTRUM, a citizen of the United States, residing at Traer, in the county of Tama and State of Iowa, have invented a new and useful Shocker Attachment for Grain Harvesters and Binders, of which the following is a specification.

The object of this invention is to provide improved means to receive successive bundles of bound grain from a harvester and stand a plurality of said bundles in a group or shock in a field.

A further object of this invention is to provide an improved attachment for harvesters for the purpose of receiving, collocating, and shocking bundles of bound grain delivered by said harvester.

My invention consists in the construction, arrangement, and combination of elements hereinafter set forth, pointed out in my claims, and illustrated by the accompanying drawing, in which—

Figure 1 is a plan of the complete machine. Fig. 2 is a side elevation of the complete machine, the shocking devices in delivering position. Figs. 3 and 4 are detail views of operating parts of the machine. Fig. 5 is a detailed view of a cam-tripping device employed in the machine. Fig. 6 is a detail elevation of parts of the mechanism.

In the construction of the machine as shown the numeral 10 designates the front bar of a frame supported at one end by a caster-wheel 11 and carrying a clevis 12 at its opposite end. The clevis 12 carries an angle-bar 13, adapted for attachment to the frame of a harvester. (Not shown.) A spring 14 and clevis 15 are mounted on the central portion of the front bar 10, by means of which yielding attachment may be made to the frame of the same harvester. A yoke-bar 16 is fixed at its closed end to and extends rearward from the inner end portion of the front bar 10, and a loop 17 is fixed to the rear end of said yoke-bar and, together with the front bar and yoke-bar, completes the main frame of the attachment. A yoke 18 is fixed to a clevis 18ª, pivoted at its end portions on a pin or bolt 19, mounted vertically through the loop 17, and a traction-shaft 20 is journaled in and extends across the rear end of said yoke, and a traction-wheel 21 is fixed to said shaft within the yoke and is adapted to engage and be rotated by the ground over which the machine passes. A rocking frame 22 is provided with a trunnion or pivot 23 near one end of one side bar thereof, and journaled in the outer end portion of the front bar 10 and at a directly opposite point the other side bar of said frame is fixed to one end portion of a shaft 24, which shaft is journaled in bearings 25 25 on and rising from the yoke-bar 16. Rocker-shafts 26 27 are arranged longitudinally of the rocking frame 22, but not in parallel planes, being spaced apart farther at their front ends than at their rear ends. Rocker-arms 28 29 of segmental or arc form, are mounted at their centers on the shafts 26 27, respectively, and are adapted to receive successive bundles of bound grain from the harvester and support the same temporarily. The rocker-arms extend above and below the shafts 26 27, the concaves of one set opposing the concaves of the other set, and said arms alternate throughout the series. A segment 30 is mounted on and extends upward, rearward, and downward from the front bar 10 and is formed with two sets of teeth 31 and 32, spaced apart and separated by a plane marginal portion 33 of considerable length. A mutilated gear 34 is mounted rigidly on the forward end portion of the rocker-shaft 26 and has diametrically opposed sets of teeth adapted to engage the teeth 31 and 32 at times and separated by plane faces 35 36. In this connection it is noted that in the oscillation of the rocking frame 22, as hereinafter described, the teeth 31 will rotate the gear 34 slightly until the plane face 35 engages and slides on the plane margin 33 of the segment and prevents further rotation of the gear until the teeth on the opposite side of the gear engage the teeth 32 and rotate said gear. Any movement of rotation of the mutilated gear 34 is communicated to the rocker-shaft 26 and to the rocker-arms 28 on said shaft.

Cranks 37 38 are mounted rigidly on the rear ends of the rocker-shafts 26 27 and are pivotally connected by a rod 39, arched upward between its ends. The cranks 37 38 are so arranged that upward movement of the first is communicated by the rod 39 to effect downward movement of the latter and the reverse, thus synchronously rotating the shaft 27 and rocker-arms 29.

It is the function of the traction-wheel 21 to oscillate the rocking frame 22 and dump the bundles from the rocker-arms 28 29, and mechanism is provided to effect such result; but it is desirable to operate such mechanism only at predetermined intervals, so as to deposit from the rocker-arms a collection of bundles sufficient to make and constitute a shock of grain. A counter-shaft 40 is mounted for rotation in the yoke 18 at right angles to the traction-shaft 20 and is provided with a bevel-gear 41 on its rear end meshing continuously with a larger bever-gear 42 on said traction-shaft. A shaft 43 is mounted for rotation in bearings 44 44, fixed to and rising from the rear end portion of the yoke-bar 16, and a bevel-gear 45 is mounted loosely on said shaft. A pin 46 is mounted in the shaft 43 and extends through a longitudinal notch in the hub of the gear 45, thus preventing rotary movement of said gear on said shaft, but permitting it to move longitudinally thereon. A spring 47 on the shaft 43 tends to hold the bevel-gear 45 in mesh with a bevel-gear 48, Fig. 2, on the forward end of the counter-shaft 40. A lever 48$^a$ is fulcrumed on a bar 49, extending across the yoke-bar 16, and one end of said lever engages an annular slot 50 in the hub of the gear 45. A frustum-shaped roller 51, Fig. 5, is mounted on the opposite end of the lever 48 and is engaged by the circular portion of the rim of a cam-wheel 52 and is crowded laterally thereby to the end of causing the lever to move the gear 45 out of engagement with the gear 48. A notch or depression 53 is formed in the rim of the cam-wheel 52 and permits the roller 51 to move laterally once during each revolution of said cam-wheel, as shown in Fig. 1, and permits the gear-wheel 45 to engage for a short time with the gear 48 until in the further travel of the cam-wheel the lever is oscillated to release such engagement. A guard 54 is mounted on and extends radially of the cam-wheel 52 and limits movement of the roller through the notch or depression 53. A sleeve 55 is mounted loosely on the shaft 24 and is held against movement along said shaft by collars 55$^a$ and 62$^a$, and a crank-arm 56 in said sleeve carries a pawl 57, and the rear end portion of said pawl is in engagement with a ratchet-feed wheel 58, mounted rigidly on the shaft 59, which shaft also carries the cam-wheel 52 and is mounted for rotation in bearings 60, fixed to and rising from the yoke-bar 16. The crank-arm 56 extends in opposite directions from the sleeve 55, and the upper end portion thereof carries the pawl 57, while a spring 61 connects said pawl to the lower end portion of said crank-arm and tends to hold said pawl in engagement with the feed-wheel 58. A crank-arm 62 is fixed to a collar 62$^a$, rigidly mounted on the shaft 24, and extends downward and forward from said shaft, and a detent 63 is pivotally connected to the lower end portion of said crank-arm and extends rearward and carries a lateral pin 63$^a$ on its inner end into engagement with the lower portion of the feed-wheel 58. A spring 64 connects the pawl 57 and detent 63, and a spring 64$^a$ further connects said detent to the crank-arm 62, and said springs tend to hold said pawl and detent in engagement with the feed-wheel 58. A toothed segment 65 is mounted rigidly on the sleeve 55 and is engaged by a toothed segment 66 on an arm 67, mounted for manual oscillation in a bearing 68, fixed to and rising from the yoke-bar 16. It is the function of the arm 67 under manual oscillation to oscillate the segment 65 and sleeve 55 and cause the pawl 57 to advance the feed-wheel 58 intermittently as the bundles are dropped upon the arms or bars 28 29. A crank-arm 69 is mounted rigidly on one end portion of the shaft 43 and is connected by a rod 70 to a longer crank-arm 71 on the shaft 24.

When the desired number of bundles of bound grain have been dropped upon and collocated by the bars 28 29 and the arm 67 has been actuated a corresponding number of times to advance the feed-wheel 58 and cam-wheel 52 sufficiently to bring the notch 53 therein in alinement with the roller 51 and permit the gear 45 to move into mesh with the gear 48, the motion of the traction-wheel 21 is communicated, through the gears 42 41, shaft 40, gears 48 and 45, to the rotation of the shaft 43, and said latter shaft transmits its motion, through the crank-arm 69, rod 70, and crank-arm 71, to the oscillation of the shaft 24. In the oscillation of the shaft 24 the rocking frame 22 is turned one-quarter revolution, its rear end moving upward. The gear 34 engages the teeth 31 and rotatively moves the rocker-shaft 24 slightly. This rotary movement of the shaft 24 is communicated, through the cranks 37 38 and rod 39, to the end of oppositely moving the rocker-shaft 27. During the first movements of the rocker-shafts 26 27 the arms or bars 28 29 are caused to first close on and grip the bundles. Then the frame 22 continues to the position shown in Fig. 2. The gear 34 engages the teeth 32 and further rotates the rocker-shafts, to the end of widely separating the rear (lower) ends of the arms 28 29, so that said arms will open from the bundles and deposit the same on their butt-ends on the ground, the attachment passing forward away from the shock thus formed. In the further operation of the mechanism the frame 22 is returned to normal position and the rocker-arms repositioned to receive successive bundles for another shock.

I claim as my invention—

1. A grain-shocking attachment, comprising a frame, a clevis articulating on an upright axis at the rear of said frame, a yoke fixed to said clevis, a traction-wheel journaled in said yoke, bevel-gearing journaled in said yoke and driven by said traction-wheel, a rocking frame mounted for oscillation on the first frame, grain receiving and dumping mechanism on said rocking frame, actuating mechanism connected to said rocking frame and geared to said bevel-gearing, and gear connections between the first frame and the grain receiving and dumping mechanism.

2. A grain-shocking attachment, comprising a suitable frame, a rocking frame mounted for oscillation thereon, rocker-shafts mounted for oscillation on and adapted for oscillation with said rocking frame, gear connections between one of said shafts and the first frame, bars mounted on said rocker-shafts, traction mechanism pivoted to and trailing behind the first frame, dumping mechanism acting on said rocking frame, a clutch between said traction and dumping mechanisms, and manually-operated step-by-step mechanism controlling said clutch.

3. A grain-shocking attachment, comprising a suitable frame, a bundle-carrying frame mounted for oscillation thereon, traction mechanism pivoted to and trailing behind the first frame, dumping mechanism geared to said bundle-carrying frame and also geared to the traction mechanism, a clutch in said dumping mechanism, a cam controlling said clutch, and a manually-operated tripping mechanism for rotating said cam.

4. A grain-shocking attachment, comprising a suitable frame and means for attaching said frame to a harvester, a curved mutilated rack on said frame, a bundle-carrying frame mounted on the first frame and arranged for oscillation on an axis transversely of the path of travel of the harvester, shafts mounted for oscillation in said bundle-carrying frame, crank-and-rod connections between said shafts, arms on said shafts opposite each other, a mutilated pinion on one of said shafts engaging said rack, traction mechanism on the main frame, dumping mechanism between said traction mechanism and the bundle-carrying frame, a clutch between said traction and dumping mechanisms, a lever controlling said clutch, a cam acting on said lever, and manually-operated devices for rotating said cam.

5. In a grain-shocking attachment, a rocking frame, connected shafts in said rocking frame, a mutilated rack, a mutilated pinion on one of said shafts engaging said rack, and arms on said shafts and adapted to receive and deposit bundles of grain.

6. In a grain-shocking mechanism, bundle-carrying mechanism mounted for oscillation, a fixed rack, a pinion in said bundle-carrying mechanism engaging said rack, traction mechanism, clutch-controlled gearing between said mechanisms, a lever controlling the clutch, a cam controlling said lever, step-by-step mechanism controlling said cam, and a lever actuating said step-by-step mechanism, said lever adapted for manual actuation coincident with the deposit of successive bundles on the carrying mechanism.

7. In a shocking attachment, a frame, means for attaching said frame to a harvester, a traction-frame pivoted to and trailing behind the first frame, a shaft 24 mounted transversely of the first frame, a bundle-frame fixed to said shaft, shafts journaled in the bundle-frame, crank-and-rod connections between the shafts in the bundle-frame, curved arms on the shafts in the bundle-frame, a mutilated rack on the main frame, a mutilated gear connecting one of the shafts in the bundle-frame and the mutilated rack, a counter-shaft journaled in the main frame, a clutch-gear on the counter-shaft adapted to engage and rotate said counter-shaft at times, traction mechanism in the traction-frame acting on said clutch-gear, crank-and-rod connections between the counter-shaft and shaft 24, tripping mechanism acting on said clutch-gear, and step-by-step mechanism on the first shaft arranged for manual actuation to operate said tripping mechanism.

JOHN OSTRUM.

Witnesses:
Thomas Hild,
Robert Hild,
H. M. Woolley.